United States Patent
Mathew et al.

(10) Patent No.: US 9,374,592 B2
(45) Date of Patent: Jun. 21, 2016

(54) MODE ESTIMATION IN PIPELINED ARCHITECTURES

(75) Inventors: Manu Mathew, Bangalore (IN); Ranga Ramanujam Srinivasan, Villupuram (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 873 days.

(21) Appl. No.: 13/607,716

(22) Filed: Sep. 8, 2012

(65) Prior Publication Data

US 2014/0072040 A1 Mar. 13, 2014

(51) Int. Cl.
- *H04N 7/32* (2006.01)
- *H04N 19/42* (2014.01)
- *H04N 19/176* (2014.01)
- *H04N 19/11* (2014.01)
- *H04N 19/107* (2014.01)
- *H04N 11/04* (2006.01)
- *H04N 7/12* (2006.01)
- *H04N 11/02* (2006.01)

(52) U.S. Cl.
CPC ............ *H04N 19/42* (2014.11); *H04N 19/107* (2014.11); *H04N 19/11* (2014.11); *H04N 19/176* (2014.11)

(58) Field of Classification Search
CPC .............. G06T 1/20; G06T 5/20; G06T 1/60; G06T 7/00; G06F 15/8023; G06F 15/8015; G06K 9/00973; G06K 9/56; H04N 7/50; H04N 7/26244; H04N 7/26031; H04N 7/26271; H04N 7/26015
See application file for complete search history.

(56) References Cited

U.S. PATENT DOCUMENTS

| | | | | |
|---|---|---|---|---|
| 5,737,022 A * | 4/1998 | Yamaguchi | ............ | H04N 19/172 375/240.15 |
| 7,072,398 B2 * | 7/2006 | Ma | ............ | H04N 19/51 348/416.1 |
| 7,236,524 B2 * | 6/2007 | Sun et al. | ................ | 375/240.12 |
| 8,526,488 B2 * | 9/2013 | Zheludkov | ............ | H04N 19/176 375/240 |
| 2004/0233989 A1 * | 11/2004 | Kobayashi | ............ | H04N 19/105 375/240.16 |
| 2005/0281336 A1 * | 12/2005 | MacInnis | ................ | H04N 5/145 375/240.16 |
| 2006/0176962 A1 * | 8/2006 | Arimura | ................ | H04N 19/159 375/240.24 |
| 2006/0193385 A1 * | 8/2006 | Yin et al. | .................. | 375/240.12 |
| 2006/0256854 A1 * | 11/2006 | Jiang | .................... | H04N 19/176 375/240.03 |
| 2008/0130748 A1 * | 6/2008 | Robers | .................... | H04N 19/61 375/240.16 |
| 2009/0110070 A1 * | 4/2009 | Takahashi | ............ | H04N 19/176 375/240.12 |
| 2010/0260269 A1 * | 10/2010 | He et al. | .................... | 375/240.27 |
| 2011/0002390 A1 * | 1/2011 | Chiu et al. | ............... | 375/240.16 |
| 2013/0202036 A1 * | 8/2013 | Nagori | ............ | H04N 19/00569 375/240.13 |

* cited by examiner

*Primary Examiner* — Sath V Perungavoor
*Assistant Examiner* — Howard D Brown, Jr.
(74) *Attorney, Agent, or Firm* — Robert D. Marshall, Jr.; Frank D. Cimino

(57) ABSTRACT

A video system includes an encoder for generating a compressed bit stream in response to a received video signal. The encoder includes a mode decision processor that is arranged to determine whether the mode of a first pixel block in a first row is an "intra-mode" or an "inter-mode." The encoder also includes a mode estimation processor that is arranged to estimate the mode of a left pixel block in a second row that is received after the first row in response to the determined mode of the first pixel block in the first row. The encoder also includes a pixel block processor that is arranged to process a pixel block in the second row that is to the right of the left pixel block in response to the estimated mode of the left pixel block.

20 Claims, 3 Drawing Sheets

MODE ESTIMATION IN PIPELINED ARCHITECTURES

BACKGROUND

Video processing applications such as video coding are often computationally intensive. The computationally intensive processing for video coding is often performed using parallel processing architectures using multiple processing engines. One example of parallel processing architectures uses a form of concurrent processing, where various, differing functions of the encoder are performed in parallel by different processing modules. The different processing modules are individual processing engines arranged as pipelined stages, where each stage concurrently operates on different coding units ("pixel blocks") of the frame being coded.

One example of pipelining used in concurrent video processing is when functions such as motion estimation, quantization, and entropy coding operate upon different pixel blocks in a pipeline fashion. A common occurrence in pipelined video applications arises when an intra-prediction estimation operation or a motion estimation operation is performed in a pipeline stage that is different from the pipeline stage in which the mode decision operation is performed. When the intra-prediction estimation operation or the motion estimation operation is performed in a differing pipeline stage, the intra-prediction estimation or motion estimation operation proceeds to the next pixel block without the benefit of determining what decision is being made by the mode decision module for the current pixel block. Accordingly, when the mode of the current pixel block is not available to the intra-prediction estimation or motion estimation module for the next block, the performance (for example, in picture quality or processing required) is adversely affected.

SUMMARY

The problems noted above are solved in large part by a video system includes an encoder for generating a compressed bit stream in response to a received video signal containing frames in response to a received video signal. The encoder includes a mode decision processor that is arranged to determine whether the mode of a first pixel block in a first row is an "intra-mode" or an "inter-mode." The encoder also includes a mode estimation processor that is arranged to estimate the mode of a left pixel block in a second row that is received after the first in response to the determination. The encoder also includes a pixel block processor that is arranged to use the estimated mode of the left pixel block to process a pixel block in the second row that is to the right of the left pixel block.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections. The term "neighbors" (as a noun or verb) includes the meaning of (items) having a proximal (e.g., close) relationship, such as directly adjacent to, adjacent to, diagonally adjacent to, and does not necessarily exclude the presence of intervening neighbors (e.g., neighbors that are placed between other neighbors).

Figure 1:
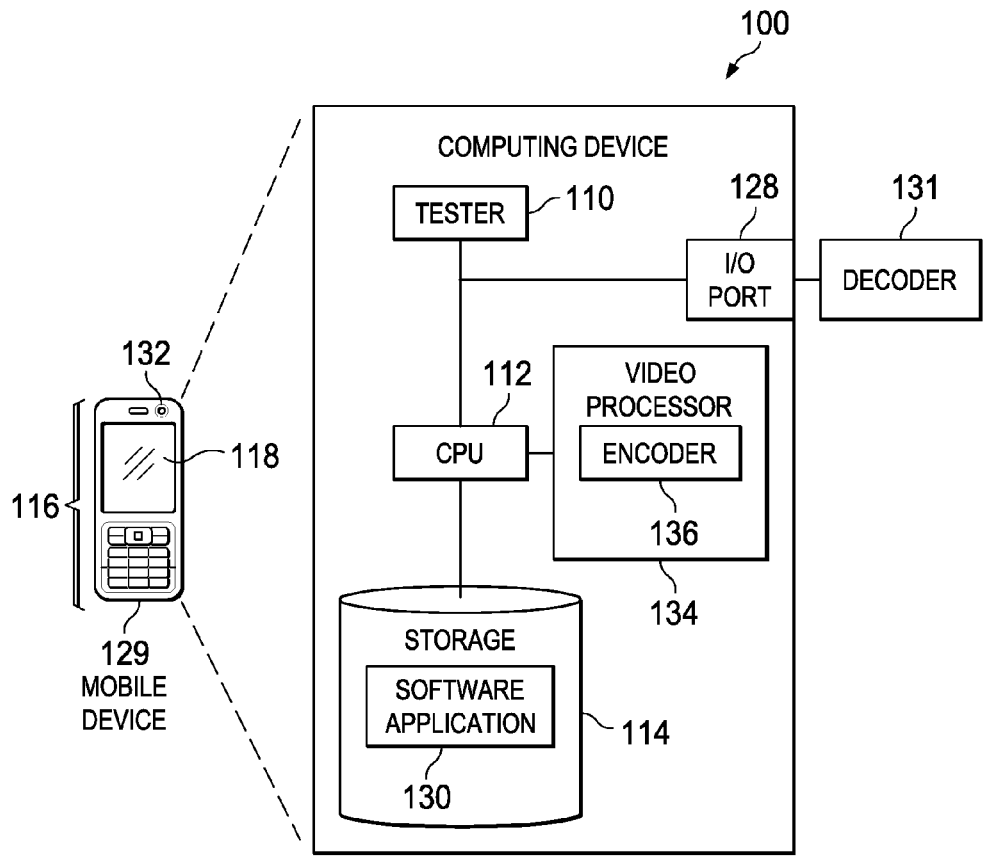
FIG. 1 shows an illustrative computing device 100 in accordance with embodiments of the disclosure.

FIG. 1 shows an illustrative computing device 100 in accordance with embodiments of the disclosure. For example, the computing device 100 is, or is incorporated into, a device 129, such as a mobile phone, set-top box, transcoding equipment, video conferencing equipment, laptop and tablet computers, a personal digital assistant (e.g., a BLACKBERRY® device), a personal computer, automotive electronics, or any other type of electronic system.

In some embodiments, the computing device 100 comprises a megacell or a system-on-chip (SoC) which includes control logic such as a CPU 112 (Central Processing Unit), a storage 114 (e.g., random access memory (RAM)) and tester 110. The CPU 112 is, for example, a CISC-type (Complex Instruction Set Computer) CPU, RISC-type CPU (Reduced Instruction Set Computer), or a digital signal processor (DSP). The storage 114 (which is a memory device such as RAM, flash memory, or disk storage) stores one or more software applications 130 (e.g., embedded applications) that, when executed by the CPU 112, perform any suitable function associated with the computing device 100. The functions performed by the various components illustrated herein may be shared between the various components or performed entirely by different components and/or one or more processors executing code, such that the functions are not necessarily limited to being performed by any one illustrated component.

The tester 110 is a diagnostic system and comprises logic (embodied at least partially in hardware) that supports monitoring, testing, and debugging of the computing device 100 executing the software application 130. For example, the tester 110 is used to emulate one or more defective or unavailable components of the computing device 100 to allow verification of how the component(s), were it actually present on the computing device 100, would perform in various situations (e.g., how the component(s) would interact with the software application 130). In this way, the software application 130 is able to be debugged in an environment which resembles post-production operation.

The CPU 112 comprises memory and logic that store information frequently accessed from the storage 114. The computing device 100 is often controlled by a user using a UI (user interface) 116, which provides output to and receives input from the user during the execution the software application 130. The output is provided using the display 118, indicator lights, a speaker, vibrations, and the like. The input is received using audio-visual inputs (using, for example, voice and/or facial recognition) and mechanical devices such as keypads, switches, proximity detectors, and the like. The CPU 112 and tester 110 is coupled to I/O (Input-Output) port 128, which provides an interface that is configured to receive input from (and/or provide output to) peripherals and/or networked devices 131, including tangible media (such as flash memory) and/or cabled or wireless media (such as provided by a cellular telephone network). These and other input and output devices are selectively coupled to the computing device 100 by external devices using wireless or cabled connections.

Device 129 is an example computing device 100 that is used to generate video streams. For example, video sensor 132 is arranged on the face of the device 129 and is arranged to generate a video signal used for a video-telephone session. Likewise, a microphone is used to generate an audio signal used for the session. The video processor 134 receives the audio and video signals and generates a video stream using encoder 136. (The video processor 134 need not be a pipelined architecture arranged as a separate video processor, but the functions of video processor 134 are distributable amongst multiple processors in a processing system, where each processor is arranged as a separate pipeline stage.) The video stream is coupled to the input/output (I/O) port 128 for transmission. The video stream is received by, for example, a second mobile device 132 that includes a decoder 131 that is arranged to decode the received video stream for playback. (The first and second mobile devices are arranged to communicate video in a full-duplex mode across a cellular network, for example.) Although the example computing device 100 is illustrated as being device 129, other systems such as video recorders, video cameras, security systems, network appliances, and the like may include the encoder 136 as described herein.

In an embodiment, the encoder 136 is arranged to encode a video stream in accordance with the Institute of Electrical and Electronic Engineers (IEEE) H.264 and H.265 standards. The H.264 standard is widely implemented video compression standard that is used in a wide variety of video recording/encoding applications such as H.264 AVC (advanced video coding), H.264 SVC (scalable video coding), and H.265 HEVC (high efficiency video coding). The video stream includes a series of pictures (e.g., frames or fields) wherein each picture is divided into a (normally fixed) number of pixel blocks (where a pixel block is, e.g., a two-dimensional arrangement of pixels at a sub-macroblock, macroblock, or a super-macroblock level). A picture includes one or more slices, wherein each slice includes a consecutive sequence of pixel blocks, wherein the length of the consecutive sequence is variable.

While pipelining operations typically provide increase processing throughput, information that is produced in the various stages is not always available at a point in the architecture where the information is needed to provide maximum performance. For example, the operation of intra-prediction estimation operates ahead ("upstream" in the pipeline structure) of the mode decision (where a mode decision result made downstream is used as an input to upstream processing applications).

Intra-prediction mode estimation in an H.264 encoder typically receives two sets of information concerning a left pixel block (e.g., where the left pixel block enters the pipeline before another pixel block that is to the right of the left pixel block enters the pipeline). A first set of information includes the reconstructed pixels of the left pixel block and the second set of information includes the mode decision (e.g., whether the mode is intra- or inter-prediction mode and if intra-prediction mode, the actual intra-prediction modes of the intra-prediction mode of each of the pixel blocks).

While video processing is normally and traditionally performed in a left-to-right, top-to-bottom order (e.g., as in traditional Western writing), other arrangements are possible: such as top-to-bottom, right-to-left (e.g., as in traditional Eastern writing). Thus the term "left" in context of pixel blocks includes the meaning of a "left" pixel block for which processing of the "left" pixel block has started before (or prior to) the similar processing of the corresponding "right" pixel block. In similar fashion, the terms "upper" (or "top" row) in context of rows of pixel blocks includes the meaning of a row of pixel blocks for which processing has started before (or prior to) the like processing of the corresponding "lower" row of pixel blocks. Further the term "row" is able to mean "column" when then the pixel blocks are processed in order of "columns."

A typical question that arises due to the lack of availability of the mode of the left pixel block is what intra-prediction directions are allowed when operating in a constrained intra-prediction mode. (When operating in a constrained intra-prediction mode, H.264-compliant intra-prediction operations ignore inter-predictions from neighboring pixel blocks.) In constrained intra-prediction mode, intra-prediction is performed using information from other intra-coded pixel blocks (such as whether a particular direction—a horizontal prediction mode, for example—is allowed only when the left pixel block is intra-coded). Constrained intra-prediction is an important H.264 AVC tool for error tolerance in a "lossy" network. Constrained intra-prediction is also used in the H.264 SVC and H.265 HEVC (high efficiency video encoding). Constrained intra prediction is often heavily depended upon in applications such as AVC and SVC as the techniques of the present disclosure typically improves the visual quality in these cases.

Another question that arises due to the lack of availability of the mode of the left pixel block is how to estimate the most probable mode (to be used predictively) when the left pixel block is intra-coded. The functionality and correctness of how the mode is estimated is able to greatly affect the overhead (processing) cost that is incurred when, for example, performing a sum of absolute difference (SAD) calculation on the processed media content. Estimating the most probable mode to be used is normally encountered in all cases of intra-prediction estimation (e.g., regardless of whether constrained intra-prediction is enabled).

As discussed above, the mode of the left pixel block would typically be determined in a later stage in the encoding (for example, the mode decision stage). However, before this stage (the mode decision stage), important decisions regarding mode estimation normally would have been taken in prior stages. Because the mode decision has not yet been determined for the left pixel block, assumptions and/or estimations are made regarding the mode of the left pixel block (e.g., in lieu of the mode decision of the mode decision stage). Incorrectly assuming the mode decision normally results in (qualitatively as well as quantitatively) poor visual quality of the video frame in which the pixel block pixels appear.

A first conventional solution is to calculate the cost per mode (e.g., total bit cost per prediction mode) for the same intra-coding mode in two cases in parallel. A first case calculates the cost per mode assuming the left pixel block has been intra-coded and the second case calculates the cost per mode assuming the left pixel block has been inter-coded. At a subsequent (e.g., later) stage in the pipeline, when the actual mode of the left pixel block becomes known, the results of the correctly assumed cost per mode calculations is used in the subsequent processing. Because this approach involves calculating two costs per mode in parallel, it is a "brute force" solution that is relatively expensive in terms of processing capacity and/or implementation complexity.

A second conventional solution is to assume the left pixel block has been intra-coded. However, the intra-coding assumption is often wrong in many cases (and wrong in most cases when low motion frames are encountered). When the intra-coding assumption fails, the intra-prediction mode that would be selected by intra-prediction mode estimation logic is often also wrong. Further, an invalid mode might be selected in the case of constrained intra-prediction, which may have to be eventually corrected. The subsequent correction often leads to a perceptible visual quality loss as viewed during empirical testing of video sequences.

A third conventional solution is to assume the left pixel block has been inter-coded. However, the inter-coding assumption often leads to incorrect processing, especially in the case where constrained intra-prediction is used (because the intra-prediction estimation stage would not use any modes that involve prediction from the left pixel block, which is assumed to be inter-coded). The inter-coding assumption leads to fewer modes being validly processed and permanently excludes some intra-prediction modes. Accordingly, the inter-coding assumption is incorrect very often when current frame being encoded has very fast motion and has lot of intra pixel blocks. The inter-coding assumption thus often leads to a perceptible visual quality loss as viewed during empirical testing of video sequences.

Figure 2:
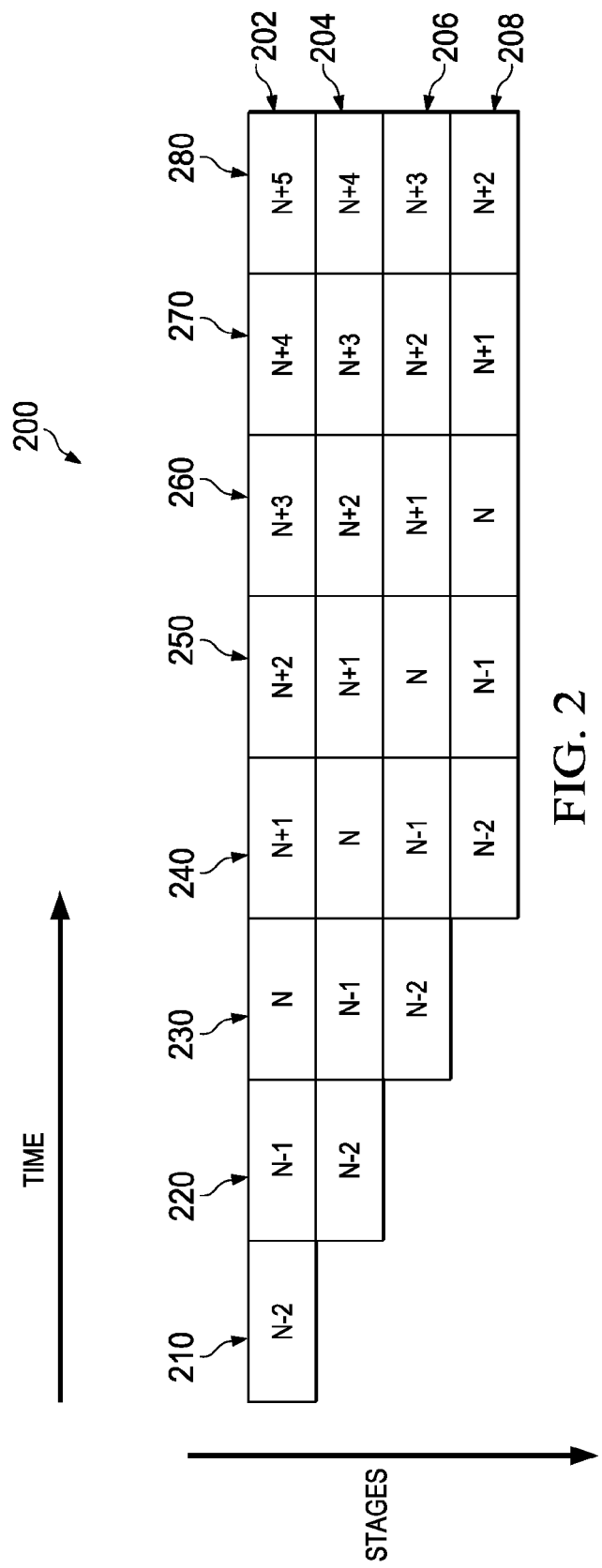
FIG. 2 is a timing diagram illustrating a pipeline processing of pixel blocks in accordance with embodiments of the present disclosure.

In contrast, the present disclosure includes an efficient scheme for coding a picture using adaptive estimation logic where the pixel block coding mode (intra-coded or inter-coded) of the left pixel block is derived from the mode of one or more neighboring pixel blocks for which a (correct) mode determination is available. As illustrated in FIG. 2, the mode of the top row of pixel blocks (after being correctly determined) is available for processing subsequent rows in spite of the pipeline constraints. When the mode of the neighboring pixel blocks is used as input for estimating the mode of the left pixel block, the results of the estimations are statistically better than the results of hardcoded assumptions (e.g., of either an intra-prediction or an inter-prediction).

FIG. 2 is a timing diagram illustrating a pipeline processing of pixel blocks in accordance with embodiments of the present disclosure. Timing diagram 200 illustrates stages 202, 204, 206, and 208 that are sequentially arranged in a pipeline. Stage 202 is arranged to fetch a pixel block from memory using, for example, direct memory accesses. Stage 204 is arranged to perform a mode estimation using the fetched pixel block. Stage 206 is arranged to perform a mode decision on the pixel block using the intra-prediction estimation. Stage 208 is arranged to reconstruct the pixel block in accordance with the mode decision.

Because the pipeline is four stages deep, the pipeline requires at least four pipeline time intervals to fill each of the four stages. For example, pixel block "N−2" is processed by stage 202 during time interval 210, by stage 204 (e.g., intra-prediction estimation) during time interval 220, by stage 206 (e.g., motion-estimation and mode decision) during time interval 230, and by stage 208 during time interval 240.

At each successive pipeline time interval, a new pixel block is successively loaded in stage 202. For example, at time 210 pixel block "N−2" is loaded, at time 220 pixel block "N−1" is loaded, at time 230 pixel block "N" is loaded, at time 240 pixel block "N+1" is loaded, at time 250 pixel block "N+2" is loaded, at time 260 pixel block "N+3" is loaded, at time 270 pixel block "N+4" is loaded, and at time 280 pixel block "N+5" is loaded. The information of the processing for each stage for a pixel block is presented to the next successive stage to be operated on during the next pipeline time interval.

As discussed above, not all information is available at a time that would be most useful to provide an optimal solution. For example, at time interval 230, a mode decision is being performed for pixel block "N−2" in stage 206, and an intra-prediction estimation is being performed for pixel block "N−1" in stage 204. Further, the processing performed in stage 204 (for pixel block "N−1") requires the result of a mode decision for (the left) pixel block "N−2" as an input. However, the result of a mode decision for pixel block "N−2" is not available until time interval 240. As disclosed herein, an intra-prediction estimation (for example) is performed for pixel block "N−1" in stage 204 using contextual information that is available during, for example, time interval 230.

The disclosed mode estimation stage provides a mode estimation judgment (e.g., most probable mode) based on the available context that is feedback-based and typically considers the history and/or the context of neighboring pixel blocks (in time and/or spatial domains, for example).

Performing a mode estimation judgment based on the available context about the left pixel block's mode provides a result that is more statistically (and/or probabilistically) correct than, for example, than a blind chance or a hardcoded assumption, for example. The mode estimation judgment is also more accurate (as compared with guessing and/or hardcoding) for frames of "scenes" having low motion objects as well as frames of complete or partial scene changes (such as in "fade" or "dissolve" videography techniques). The contextual information is gleaned from the time-critical results of the processing of neighboring pixel blocks in a frame as illustrated in FIG. 3.

Figure 3:
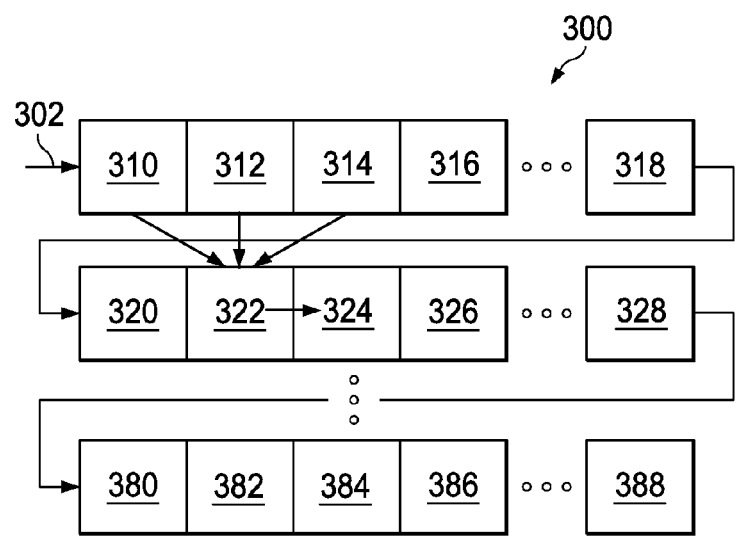
FIG. 3 is a temporal-spatial diagram illustrating a raster order for processing neighboring pixel blocks in accordance with embodiments of the present disclosure.

FIG. 3 is a temporal-spatial diagram illustrating a raster order for processing neighboring pixel blocks in accordance with embodiments of the present disclosure. Frame 300 includes a first row of pixel blocks (including pixel blocks 310, 312, 314, 316 through 318), a second row of pixel blocks (320, 322, 324, 326 through 328), and a bottom row of pixel blocks (380, 382, 384, 386 through 388). (For simplicity of illustration, not all pixel blocks, and not all rows of pixel blocks, have been shown.)

The pixel blocks are processed in an order (such as raster order 302), where a temporal-spatial relationship exists between and amongst each of the pixel blocks of the frame 300. Typically, the top row of pixel blocks is processed first, then the second row of pixel blocks, and so on until the bottom row of pixel blocks is finally processed. Because the first row is processed before the second row (using the four-stage pipelined processor of FIG. 2, for example), the results of processing each pixel block of an upper (and/or prior) row are typically available before the start of the processing of each pixel block of an lower (and/or subsequent) row.

More specifically, the pipeline is arranged such that the results of processing pixel blocks of an upper row that neighbor a pixel block of a successive row are normally available before starting the processing of the pixel block of the lower row. As disclosed herein, context from an upper row (and/or prior processed row) is used in the inter-frame estimation that is used for processing a pixel block that occurs before the actual mode decision used for processing the pixel block is made.

For example, the mode decision from a left macro block (322) is used to process a pixel block (324) before the determination for the mode of the left macro block (322) is made. As discussed above, the results of the mode decisions of the prior processed row(s) are available. Thus, a context of the mode decisions made for pixel blocks having a close spatial relationship to the left pixel block (322) is available (due to, for example, being processed ahead of the current pixel blocks that are currently in the pipeline). The context is determined from using the results of calculations for pixel blocks that are "near" and above (e.g., processed prior) the left macro block (322).

In an embodiment, the mode of the top-left pixel block (e.g., 312) is used as context for performing an estimation of the mode of the left pixel block (e.g., 322). The top-left pixel block (e.g., 312) has a close spatial relationship to the pixel block (e.g., in the frame) for which the estimation is being performed and is more likely to be probabilistically correct due to a normally (e.g., in typical video sequences) high correlation of similar modes between adjacent (and/or close) pixel blocks. For example, if the mode of the top-left pixel block (e.g., 312) mode is "intra," there is a higher likelihood for the left pixel block (e.g., 322) to also be "intra." Similarly, if the top-left pixel block's mode is "inter," there is a high is a higher likelihood for the left pixel block (e.g., 322) to also be "inter."

In another embodiment, the context is derived from calculation results from a plurality of neighboring pixel blocks from prior processed rows. For example, the calculated modes of a pixel block (e.g., 310) to the left of the top-left pixel block (e.g., 312), the top-left pixel block (e.g., 312), and the pixel block (e.g., 314) to the right of the top-left pixel block (e.g., 312) is used as context for performing an estimation of the mode of the left pixel block (e.g., 322). The pixel block 310 thus has a diagonal neighboring relationship to the left pixel block (e.g., 322), the pixel block 312 thus has a direct neighboring relationship to the left pixel block (e.g., 322), and the pixel block 314 also has a diagonal neighboring relationship to the left pixel block (e.g., 322).

A numerical function such as a median or average (or a weighted average that uses weights determined by a bell-curve function where the curve is centered using the greatest weight for the top-left pixel block) function is used to develop a probability that is used to estimate a mode for the top-left pixel block. The mode is represented as value from a range of values, which allows mathematic functions to be performed. The developed probability is then compared against a numeric threshold to determine whether the result of the estimation is "inter" or "intra." Thus, the context can be developed from any number of pixel blocks, and from pixel blocks from any prior processed row. In some cases, the use of this median mode increases the probability of correct estimation.

Empirical studies were performed to determine the effect of estimating the mode of left pixel blocks using a context derived from neighboring pixel blocks in a prior processed row. Table I lists a percentage of false estimations using two conventional methods and using two methods as disclosed herein:

TABLE I

| | Test case | | | |
|---|---|---|---|---|
| | A | B | C | D |
| Trailer 1 (with fade) | 61% | 11% | 4% | 4% |
| Trailer 2 | 25% | 18% | 4% | 4% |
| Trailer 3 | 12% | 11% | 6% | 5% |
| Trailer 4 | 77% | 5% | 3% | 2% |
| Trailer 5 | 60% | 6% | 2% | 2% |
| Trailer 6 | 39% | 31% | 5% | 5% |

In column A, where the mode of the left pixel block was assumed to be "intra," the intra-prediction mode estimation process was the least accurate of the methods tested on trailers of typical commercial films. In column B, where the mode of the left pixel block was assumed to be "inter," the inter-prediction mode estimation process was the next-least accurate of the methods tested on movie trailers. In column C, where the mode of the left pixel block was assumed to be the same as the mode of the top-left pixel block, the inter-prediction mode estimation process was the next-most accurate of the methods tested on movie trailers. In column D, where the mode of the left pixel block was assumed to be the same as that of top-left pixel block, the inter-prediction mode estimation process was the most accurate of the methods tested on movie trailers.

Accordingly, the disclosed methods used for columns C and D (which use the mode of top-left mode as an estimation as disclosed herein) empirically reduced the percentages of false estimations to less than 10% in most cases that were analyzed. In contrast, the conventional methods used for columns A and B had high rates of false estimations in some cases. The false estimation percentages were especially high in trailer sequences that contains fast motion and frequent scene changes. False estimations that were as high as 50% to 90% were observed between some frames of tested fast-changing sequences.

Figure 4:
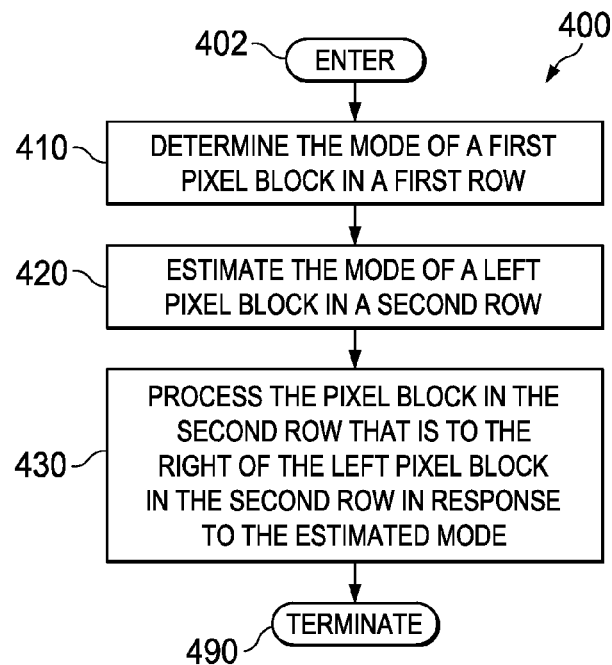
FIG. 4 illustrates a flow diagram for mode estimation in pipelined architectures in accordance with embodiments of the present disclosure.

FIG. 4 illustrates a flow diagram for mode estimation in pipelined architectures in accordance with embodiments of the present disclosure. At node 402, the process 400 is entered. At operation 410 the mode of a first pixel block in a first row is an "intra-mode" or an "inter-mode" is determined. Program flow proceeds to operation 420.

At operation 420, the mode of a left pixel block in a second row that is received after the first row is estimated. The estimation is performed in response to the determined mode of the first pixel block in the first row, where the left pixel block neighbors the first pixel block in the first row. Program flow proceeds to operation 430.

At operation 430, a pixel block in the second row that is to the right of the left pixel block in the second row is processed in response to the estimated mode of the left pixel block. Program flow proceeds to node 490, where the process 400 is exited.

Figure 5:
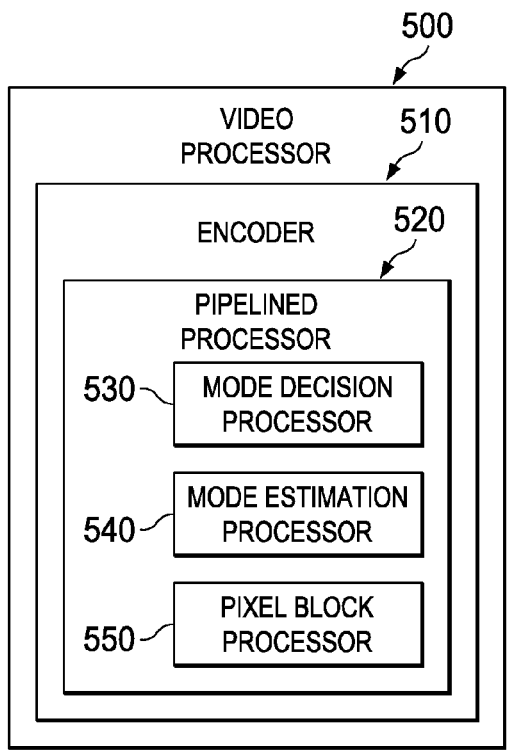
FIG. 5 illustrates a schematic diagram for mode estimation in pipelined architectures in accordance with embodiments of the present disclosure.

FIG. 5 illustrates a schematic diagram for mode estimation in pipelined architectures in accordance with embodiments of the present disclosure. The functions performed by the various illustrated components may be shared between the various components or performed entirely by different components and/or processors executing code, such that the functions are not necessarily limited to being performed by any one illustrated component.

Video processor 500 is a video processor such as video processor 134, and includes an encoder 510 such as encoder 136. Encoder 510 includes a mode decision processor 530, a mode estimation processor 540, and a pixel block processor 550. Mode decision processor 530, such as referenced above with respect to stage 206, is arranged to determine whether the mode of a first pixel block (such as pixel block 312) in a first row is an "intra-mode" or an "inter-mode."

Mode estimation processor 540 is arranged to estimate the mode of a left pixel block (such as pixel block 322) in a second row that is received after the first row. The estimation is performed in response to the determined mode of the first pixel block (such as pixel block 312) in the first row, where the left pixel block (such as pixel block 322) neighbors (e.g., directly underneath) the first pixel block (such as pixel block 322) in the first row.

Pixel block processor 550 is arranged to process a pixel block (such as pixel block 324) in the second row that is to the right of the left pixel block (such as pixel block 322) in response to the estimated mode of the left pixel block. Accordingly, a probabilistically more-accurate estimation of the mode for a particular pixel block (such as pixel block 324, which is to be processed with the mode decision of the left pixel block 322) is used to process the particular pixel block, even before a definitive mode decision has been made for the left pixel block of the particular pixel block.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. A video processor, comprising
   a mode decision processor that is arranged to determine whether the mode of a first pixel block in a first row is an "intra-mode" or an "inter-mode;"
   a mode estimation processor that is arranged to estimate whether the mode of a left pixel block in a second row that is received after the first row in response to the determined mode of the first pixel block in the first row is more likely an "intra-mode" or an "inter-mode", wherein the left pixel block neighbors the first pixel block in the first row; and
   a pixel block processor that is arranged to process a pixel block in the second row that is to the right of the left pixel block in response to the estimated more likely "intra-mode" or "inter-mode" of the left pixel block.

2. The processor of claim 1, wherein the mode decision processor is arranged to provide an indication of which intra-prediction directions are allowed when operating in a constrained intra-prediction mode.

3. The processor of claim 1, wherein the pixel blocks are generated in response to a received video signal containing frames.

4. The processor of claim 1, wherein the received pixel blocks are arranged in accordance with a spatial arrangement in the frame.

5. The processor of claim 4, wherein the received pixel blocks are received in a raster order in accordance with the spatial arrangement in the frame.

6. The processor of claim 1, wherein the mode estimation processor is arranged in a pipeline processor where the output of the mode estimation processor is coupled to the input of the pixel block processor.

7. The processor of claim 6, wherein the mode decision processor is arranged in a pipeline processor where the output of the pixel block processor is coupled to the input of the mode decision processor.

8. The processor of claim 7, wherein the left pixel block in a second row is processed by the mode decision processor while the pixel block in the second row that is to the right of the left pixel block is processed by the mode estimation processor.

9. The processor of claim 1, wherein the mode estimation processor is arranged to estimate the mode of the left pixel block in response to a determined mode of the pixel block to the left of the first pixel block in the first row and in response to a determined mode of the pixel block to the right of the first pixel block in the first row.

10. The processor of claim 9, wherein the mode estimation processor is arranged to estimate the mode of the left pixel block in response to numeric values that represent the determined modes of the pixel block to the left of the first pixel block in the first row, the first pixel block in the first row, and the determined mode of the pixel block to the right of the first pixel block in the first row.

11. The processor of claim 1, wherein the estimated mode of the left pixel block is used to process the pixel block in the second row that is to the right of the left pixel block before the determination for the mode of the left macro block is made.

12. A video system, comprising:
    a video processor that is arranged to receive a video signal from which rows of pixel blocks are determined; and
    an encoder that is arranged to determine whether the mode of a first pixel block in a first row is an "intra-mode" or an "inter-mode," that is arranged to estimate whether the mode of a left pixel block in a second row that is received after the first row in response to the determined mode of the first pixel block in the first row is more likely an "intra-mode" or an "inter-mode", wherein the left pixel block neighbors the first pixel block in the first row; and that is arranged to process a pixel block in the second row that is to the right of the left pixel block in response to the estimated more likely "intra-mode" or "inter-mode" of the left pixel block.

13. The system of claim 12, wherein the encoder is arranged to estimate a mode for each left pixel block having a pixel block arranged to the right of the left pixel block in the second row.

14. The system of claim 12, wherein the mode of the left pixel block in the second row is estimated in response to a determined mode of one or more neighboring pixel blocks in a row that is received before the second row.

15. The system of claim 12, wherein the mode of the left pixel block in the second row is estimated in response to a determined mode of one or more neighboring pixel blocks in a row that is received before the second row.

16. A method for video processing, comprising:
    determining whether the mode of a first pixel block in a first row is an "intra-mode" or an "inter-mode;"
    estimating the mode of a left pixel block in a second row that is received after the first row in response to the determined mode of the first pixel block in the first row is more likely "intra-mode" or "inter-mode", wherein the left pixel block neighbors the first pixel block in the first row; and
    processing a pixel block in the second row that is to the right of the left pixel block in response to the estimated more likely "intra-mode" or "inter-mode" of the left pixel block.

17. The method of claim 16, comprising performing the method of claim 16 for each pixel block in the second row that has a pixel block to the left.

18. The method of claim 17, comprising encoding a video stream in response to the estimated more likely "intra-mode" or "inter-mode" of the left pixel block.

19. The method of claim 16, wherein the mode of the left pixel block in the second row is estimated in response to a determined mode of one or more neighboring pixel blocks in a row that is received before the second row.

20. The method of claim 19, wherein the neighboring pixel blocks in the row that is received before the first row have a directly or diagonally adjacent to the left pixel block in the second row.

* * * * *